Oct. 1, 1929. H. H. HAMBLETON 1,730,272

PULLEY BLOCK

Filed Sept. 7, 1926

H. H. Hambleton
INVENTOR

By: Marks & Clerk
ATTYS.

Patented Oct. 1, 1929

1,730,272

UNITED STATES PATENT OFFICE

HUGH HENRY HAMBLETON, OF GREYMOUTH, NEW ZEALAND, ASSIGNOR OF ONE-HALF TO ALICE ADELINE BALDWIN, OF HATAITAI, WELLINGTON, NEW ZEALAND

PULLEY BLOCK

Application filed September 7, 1926. Serial No. 134,032.

This invention relates to an improved pulley block of the type used for hauling heavy timber either in bush country, timber yards or such like places, and my invention can also be used for loading ships and the like purposes.

The object of my invention is to provide an improved type of pulley block characterized by having large renewable wearing surfaces, means to prevent the fouling of the rope between the sheave and the cheeks of the block, means to provide a positive lubrication of the running parts, and also to adequately protect them from dust and dirt.

I am aware of previous inventions in the same class but none give entire satisfaction, as owing to the tremendous strain the pulley blocks have to sustain, they soon become worn on the pin and bushes, and the rope is ruined or damaged through getting between the cheeks and sheaves of the block and as the block is sometimes buried in mud and slush it is impossible to keep it oiled.

With my improved pulley block the wearing surfaces thereof are greatly increased, thus reducing the pressure per square inch, and the cheeks of the block being held rigid with a bolt or bolts it is impossible for the rope to get foul. The sheave being V shaped on the inner circumference ensures its running true between the cheeks, and the felt washer inserted in the cheeks makes the block oil tight, the sheave ring running in a bath of oil and the washers also keep out any dirt from the wearing surfaces.

The essential features of my invention comprise a grooved sheave having a large V shaped bearing surface, renewable bearing segments, a rib or lug on the block cheeks for holding said bearing segments, the projection of the block cheeks over the outer diameter of the sheave, the provision of an oil receptacle for lubrication, and dust and dirt protecting means.

I make reference to the accompanying sheet of drawings, in which.

Figures 1, 2:
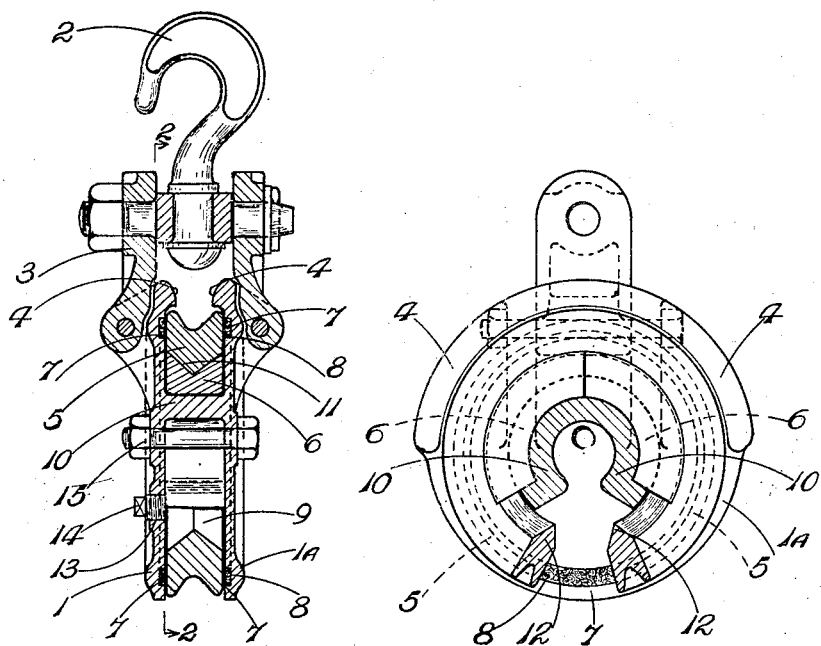
Figure 1 is a section of the assembled block.
Figure 2 is a sectional elevation of the block on line 2—2 in Figure 1.
Figure 3:
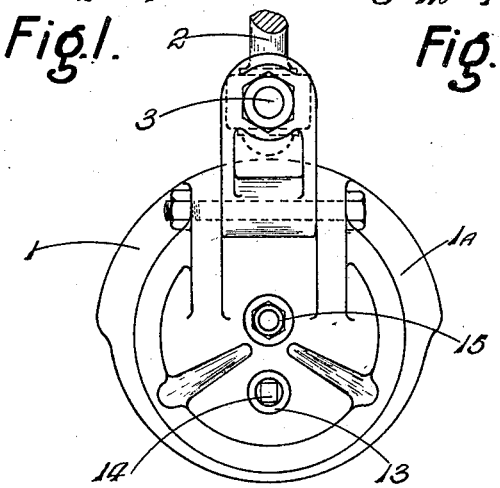
Figure 3 is an outside elevation of the block cheeks.

The pulley block consists of two metal cheek plates 1 and 1A of suitable dimensions and weight, the said plates being provided with a hook 2 and bridle 3 to form the snatch block type of the usual form. The said cheek plates 1 and 1A are provided at their upper ends with guide lips 4 for leading the usual wire rope (not shown) on to the sheave 5 and at the same time the said lips form means for holding the said sheave down to the bronze or steel segments 6.

An annular groove 7 is formed in each cheek plate 1 and 1A and is of ample size to permit insertion of some suitable material to act as a dust-excluding member and as an oil retaining means, the members located within the grooves being indicated at 8. The lower portions of the cheek plates 1 and 1A in conjunction with the members 8 form a chamber or container 9 for receiving and retaining a lubricant. The cheeks 1 and 1A are formed internally with a steadying piece or seat 10 suitably shaped to receive and support the segmental pieces 6 upon which the rope sheave 5 is mounted for rotation. The said segmental pieces 6 are preferably V shaped on their outer circumference 11 and the before mentioned rope sheave 5 is also V shaped on its inner circumference 12 to correspond with the construction of the said segmental pieces 6 and thus provide a bearing which tends to keep the said sheave 5 running in a normal vertical plane to its axis.

Access to the oil or grease compartment 9 is by a hole 13 into which is screwed a standard plug 14.

When assembled the cheeks 1 and 1A of the pulley block are held in position and together by a bolt 15 and bridle 3 of the hook 2.

It will of course be understood that a pulley block constructed according to my invention can be made in any size suitable for the load it is required to carry.

What I claim as new and desire to secure by Letters Patent is:—

1. An improved pulley block comprising metal cheek plates, a hook, a bridle adapted to fix said hook on said cheek plates, a seat member connecting said metal cheek plates, a renewable segmental bearing piece disposed on said seat having an upper bearing surface, means for retaining said bearing in position; said upper bearing surface of said bearing being V-shaped, and a sheave having a bore adapted to fit said bearing surface disposed between said cheek plates in said V-shaped segmental bearing.

2. An improved pulley block comprising two metal cheek plates, a hook, a bridle adapted to fix said hook on said cheek plates, a bolt for retaining said plates in position; an annular seat member disposed between and fixed to said cheek plates, a renewable segmental bearing piece disposed on said seat having an upper bearing surface, means for retaining said bearing in position, said upper bearing surface of said bearing being V-shaped, and a sheave having a bore adapted to fit said bearing surface disposed between said cheek plates in said V-shaped segmental bearing.

3. An improved pulley block comprising two metal cheek plates, a hook, a bridle adapted to fix said hook on said cheek plates, a bolt for retaining said plates in position; an annular seat member disposed between and fixed to said cheek plates, a renewable segmental bearing piece disposed on said seat having an upper bearing surface, means for retaining said bearing in position, said upper bearing surface of said bearing being V-shaped, a sheave having a bore adapted to fit said bearing surface disposed between said cheek plates in said V-shaped segmental bearing, the seat member, sheave and cheek plates forming a lubricating chamber.

In testimony whereof I affix my signature.

HUGH HENRY HAMBLETON.